Patented Apr. 21, 1953

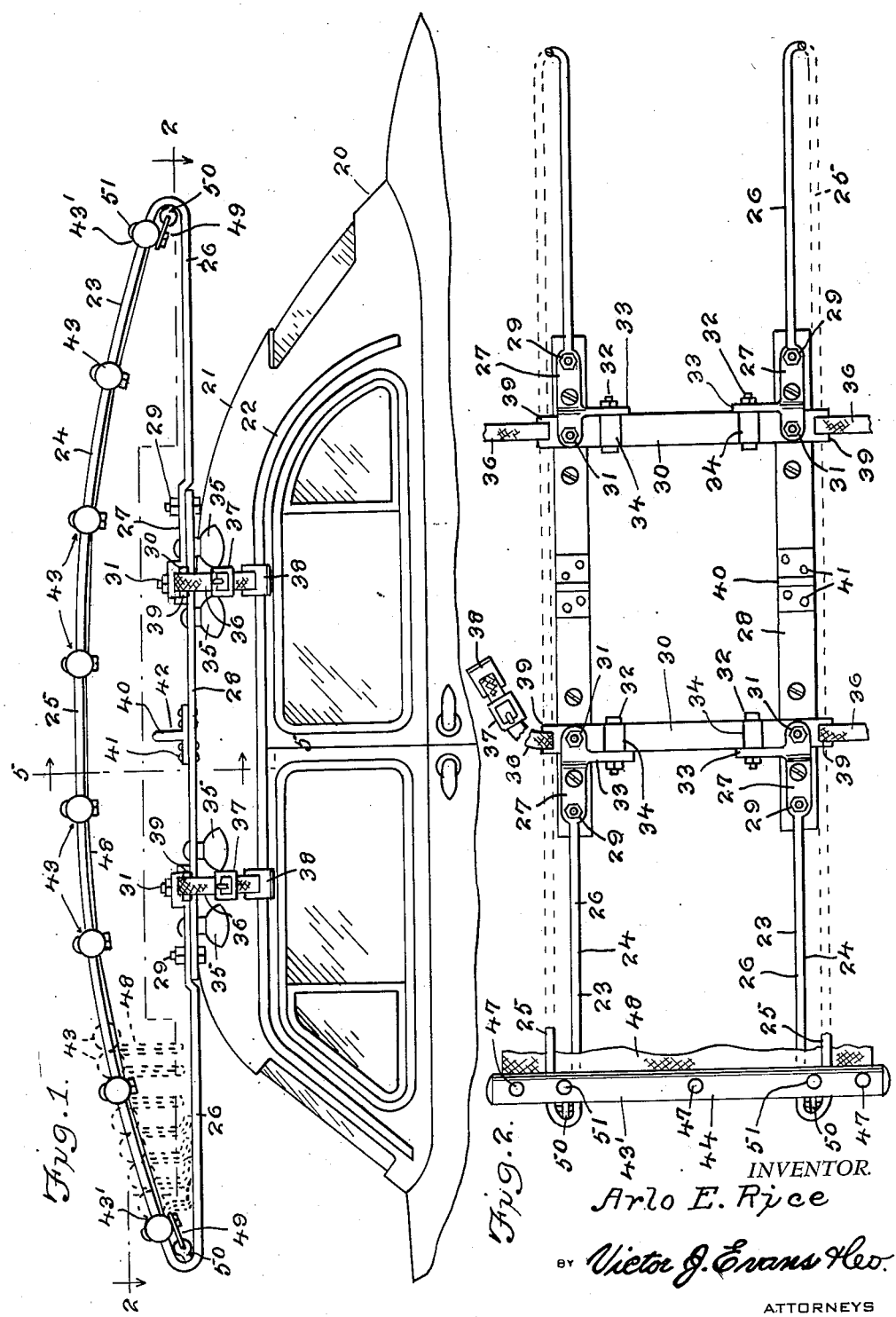

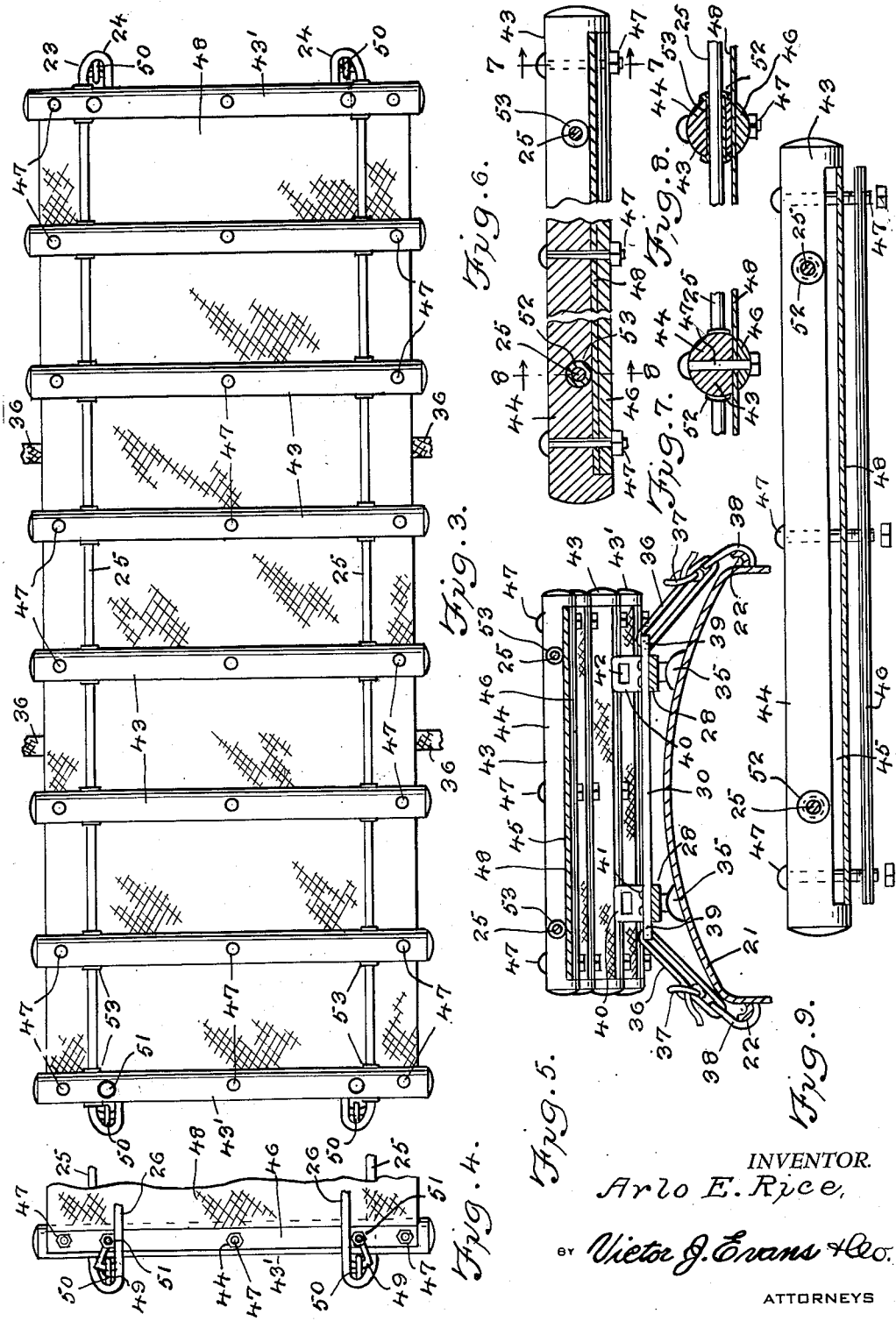

2,635,615

UNITED STATES PATENT OFFICE 2,635,615

ADJUSTABLE SLIDING AWNING

Arlo E. Rice, Mineral Wells, Tex.

Application May 22, 1950, Serial No. 163,380

5 Claims. (Cl. 135—5)

This invention relates to an awning or cover, and more particularly to an awning for a vehicle, such as an automobile.

The object of the invention is to provide an awning which is adjustably mounted on the top of a vehicle, whereby the awning can be moved into and out of operative position on the vehicle when it is to be used, the awning helping to preserve the life of the vehicle, as well as increasing the comfort to the occupants thereof.

Another object of the invention is to provide an adjustable awning assembly for the top of a vehicle which is constructed so that articles, such as luggage, can be conveniently supported on the top of the vehicle without danger of the articles accidentally falling from the vehicle.

Another object of the invention is to provide an adjustable awning assembly for a vehicle which will help maintain the interior of the vehicle cool by shielding the vehicle from the direct rays of the sun, the awning also helping to prevent dew or moisture from collecting on the top of the vehicle, and the awning serving to prevent hail and the like from damaging the vehicle.

A further object of the invention is to provide an awning assembly which is extremely simple and inexpensive to manufacture.

Other objects and advantages will be apparent during the course of the following description.

In the accompanying drawings forming a part of this application, and in which like numerals are used to designate like parts throughout the same:

Figure 1 is a side elevational view showing the awning assembly of the present invention attached to the top of a vehicle;

Figure 2 is a sectional view taken on the line 2—2 of Figure 1;

Figure 3 is a top plan view of the awning assembly of the present invention;

Figure 4 is a fragmentary, bottom plan view showing certain constructional details of the awning assembly;

Figure 5 is a sectional view taken on the line 5—5 of Figure 1;

Figure 6 is a fragmentary, elevational view of one of the cross bars, with parts broken away and in section;

Figure 7 is a sectional view taken on the line 7—7 of Figure 6;

Figure 8 is a sectional view taken on the line 8—8 of Figure 6;

Figure 9 is an enlarged elevational view of one of the cross bars, showing the lower section separated from the upper section.

Referring in detail to the drawings, the numeral 20 designates a portion of a conventional vehicle, such as an automobile, Figure 1, the automobile 20 including the usual gutters 22 and top 21. The gutters 22 are for the purpose of conveniently conveying away rain from the top 21 of the vehicle.

The present invention is directed to an awning assembly for mounting on the top of the vehicle 20, whereby the awning assembly of the present invention will have prolonged the life of the vehicle, and also the awning assembly will enable occupants of the vehicle to ride in greater comfort.

The awning assembly of the present invention includes a frame 23, the frame 23 embodying a pair of spaced, parallel body members 24. Each of the body members 24 has the same construction, and each comprises an arcuate rail 25. Each of the rails 25 has its free ends terminating in horizontally disposed legs 26, Figure 1. Formed integrally with or secured to each end of the legs 26 is a foot 27, the foot 27 being arranged offset with respect to the leg 26. A horizontally disposed rod 28 extends between the pair of feet 27 on each of the body members 24, and the rod 28 is connected to these feet by suitable bolt-and-nut assemblies 29. It will be seen that there are two of the rods 28, and these rods are arranged in spaced, parallel relation with respect to each other.

Arranged at right angles with respect to the rod 28 is a pair of spaced, parallel, horizontally disposed braces 30, Figure 2. The braces 30 each have their ends interposed between the feet 27 and the rods 28, and suitable bolt-and-nut assemblies 31 extend through the feet 27, through the braces 30, and through the rods 28 for maintaining these parts in assembled relation. Suitable bolt-and-nut assemblies 32 serve to connect a lug 33 that projects from each of the feet 27 to a shoulder or enlargement 34 on the braces 30, Figure 2.

Projecting downwardly from the rod 28 is a plurality of suction cups 35, the suction cups 35 being arranged in engagement with the top 21 of the vehicle. These suction cups 35 provide a support for the awning assembly, and also help to maintain the awning assembly immobile on the top of the automobile.

A further means is provided for anchoring the frame or awning assembly on the top of the vehicle. This means comprises a plurality of flexible straps 36. One of the straps 36 is arranged in engagement with an eye 39 on each of the braces 30. Each of the straps 36 includes a buckle 37, whereby the length of the strap 36 may be adjusted as desired, and arranged on the free end of the strap 36 is a hook 38. The hooks 38 of the straps 36 are adapted to be arranged in engagement with the gutters 22 of the vehicle, so as to provide an additional anchoring means for the awning assembly on the vehicle. It will be seen that a pair of the hooks 38 engage each of the gutters 22.

A bracket 40 is secured to each of the rods 28 by suitable securing elements, such as rivets 41. Each of the brackets 40 is provided with an eye or opening 42. Thus, articles of luggage and the like may be supported on the top of the vehicle and arranged between the pair of braces 30. Then, suitable straps can be inserted through the openings 42 in the brackets 40 and arranged in engagement with these articles of luggage, so that the luggage will not accidentally fall off the top of the vehicle while being transported.

Extending between the rails 25 is a plurality of cross bars 43. Each of the cross bars 43 includes an upper section 44 which is provided with a cut-away portion 45, Figure 9, and a bottom section 46 is adapted to fit snugly in the cut-away portion 45. The bottom section 46 and the upper section 44 are detachably connected together by a plurality of bolt-and-nut assemblies 47, Figure 7. The cross bars 43 are slidably or adjustably mounted on the pair of rails 25, so that the cross bars 43 can be manually moved along the rails 25 as desired.

Extending between the cross bars 43 is an elongated, flexible cover or awning 48 which may be fabricated of any suitable material, such as canvas or cloth. The cover 48 is positioned between the upper section 44 and the lower section 46 of the cross bars 43, and the cover 48 is connected to the cross bars by the bolt-and-nut assemblies 47. The two end cross bars are designated by the numeral 43'. Connected to each of the end cross bars 43' is a pair of hook members 49, and the hook members 49 are adapted to be arranged in engagement with an eye 50. It will be seen that a pair of the eyes 50 are provided for each of the body members 24, the eyes 50 being arranged adjacent to the connection of the rail 25 and the leg 26. By arranging the hook members 49 in engagement with the eyes 50, the cover 48 can be maintained in its operative or extended position. The hook members 49 are pivotally connected to the end cross bars 43' by a pin 51, Figure 3.

As previously stated, the cross bars 43 and 43' are all slidably mounted on the pair of rails 25. Thus, each of the upper sections 44 of the cross bars is provided with a pair of spaced openings 53, Figure 8, and a sleeve 52 is arranged in each of the openings 53. The rails 25 slidably project through the sleeves 52, so that damage to the cross bars will be prevented by the movement of the cross bars along the rails.

When the awning assembly is to be used, the cross bars 43 and cover 48 are in the extended or open position shown in Figures 1 and 3, so that occupants of the automobile 20 will be shielded from the direct rays of the sun. Also, the cover 48 will help protect the top of the vehicle from hail, rain, dew and the like. The hook members 49 engage the eyes 50 to maintain the cover 48 in its extended position. When the awning is not needed, it can be moved to a closed position, as indicated by dotted lines in Figure 1. Thus, to move the cross bars 43 and cover 48 from the solid line position of Figure 1 to the dotted line position, a pair of the hook members 49 are disengaged from the eyes 50, whereby the cross bars 43 can be readily slid along the rails 25 until the cross bars 43 occupy the dotted line position of Figure 1. The suction cups 35 and the hooks 38 on the straps 36 serve to anchor the awning assembly on top of the vehicle. Also, the brackets 40 are adapted to be engaged by cords or straps, whereby articles of luggage and the like can be anchored or secured on top of the vehicle.

The awning of the present invention will maintain the car comfortably cool for the occupants of the vehicle, as well as provide a means for supporting luggage, and also the awning will provide shelter in case of hail and protection from dew when the car is parked outside. The various parts of the awning assembly can be made of any suitable material.

I claim:

1. In an awning assembly including a frame adapted to be supported on the top of a vehicle, said frame comprising a pair of arcuate shaped body members, horizontally disposed legs extending inwardly from each end of said body members, an offset foot on the end of each leg, a horizontally disposed rod connected to and extending between the feet on each body member, a plurality of suction cups on each rod, a cover adjustably connected to said frame, means carried by said body members for maintaining the cover in extended position on said frame, and hook means extending from said frame and adapted to be connected to the top of the vehicle.

2. An awning assembly for mounting on the top of a vehicle comprising a frame adapted to be mounted on the top of the vehicle and including a pair of spaced parallel body members, each of said body members comprising an upper arcuate rail, a horizontally disposed leg secured to each end of said rail, said horizontally disposed legs each terminating in a foot, a pair of rods extending between said feet and connected thereto, suction cups arranged below said rods and adapted to engage the vehicle top, a pair of horizontally disposed braces extending between said rods and secured thereto, an adjustable strap connected to each end of said braces, a hook arranged on the free ends of said straps, said hooks adapted to engage with the top of the vehicle, a plurality of cross bars each including an upper section and a lower section detachably connected together, there being a pair of spaced openings in said upper section for the slidable projection therethrough of said rails, and a canvas cover positioned between the upper and lower sections of said cross bars and connected thereto, and coacting hooks and eyes for maintaining said cover in extended position.

3. The apparatus as described in claim 2, and further including brackets secured to said rods adapted to be used in anchoring articles of luggage.

4. The awning assembly as in claim 2 wherein means is provided on said frame for attaching articles of luggage to said frame.

5. An adjustable awning assembly for mounting on the top of a vehicle comprising a pair of spaced parallel body members, each of said body members comprising an upper arcuate rail and a horizontally disposed flat portion joining the ends of the arcuate rail, means connected to the flat portions of said body members for removably securing said body members to the top of the vehicle, a plurality of cross bars having openings adjacent each end thereof whereby said cross bars are slidably mounted on said body members, an elongated flexible cover connected to said cross bars and said cross bars adapted to be manually slid along on the arcuate rails of said body members to fold said cover into a compact unit at any desired point on the arcuate rails of said body members or slid to full opened position with relation to the top of the vehicle and means cooperating with said body members at the junction of said arcuate rails and said flat portions and the outermost cross bars to retain said cross bars and cover in fixed relation to said body members.

ARLO E. RICE.

References Cited in the file of this patent

UNITED STATES PATENTS

| Number | Name | Date |
|---|---|---|
| 1,064,083 | Nicolai | June 10, 1913 |
| 2,434,387 | Brandt | Jan. 13, 1948 |
| 2,496,085 | Engelheart | Jan. 31, 1950 |